(12) United States Patent
Decke et al.

(10) Patent No.: US 10,872,485 B2
(45) Date of Patent: Dec. 22, 2020

(54) COMMUNICATION SYSTEM FOR MANAGING USAGE RIGHTS ON A VEHICLE

(71) Applicant: VOLKSWAGEN AG, Wolfsburg (DE)

(72) Inventors: Hendrik Decke, Braunschweig (DE); André Oberschachtsiek, Braunschweig (DE)

(73) Assignee: Volkswagen AG, Wolfsburg (DE)

( * ) Notice: Subject to any disclaimer, the term of this patent is extended or adjusted under 35 U.S.C. 154(b) by 589 days.

(21) Appl. No.: 15/674,584

(22) Filed: Aug. 11, 2017

(65) Prior Publication Data

US 2018/0053362 A1 Feb. 22, 2018

(30) Foreign Application Priority Data

Aug. 19, 2016 (DE) .......................... 10 2016 215 628

(51) Int. Cl.
| | | |
|---|---|---|
| G07C 9/28 | (2020.01) | |
| H04W 12/08 | (2009.01) | |
| H04W 12/06 | (2009.01) | |
| G07C 9/00 | (2020.01) | |
| H04W 4/40 | (2018.01) | |
| H04W 12/00 | (2009.01) | |

(Continued)

(52) U.S. Cl.
CPC .............. *G07C 9/28* (2020.01); *G06Q 20/40* (2013.01); *G07C 9/00857* (2013.01); *H04L 63/10* (2013.01); *H04W 4/40* (2018.02); *H04W 12/0023* (2019.01); *H04W 12/06* (2013.01); *H04W 12/08* (2013.01); *G07C 9/00309* (2013.01); *G07C 2009/00865* (2013.01); *H04L 2463/082* (2013.01)

(58) Field of Classification Search
CPC ............ G07C 9/00111; G07C 9/00857; G07C 2009/00865; G07C 9/00309; H04W 12/0023; H04W 4/40; H04W 12/06; H04W 12/08; H04L 63/10; H04L 2463/082; G06Q 20/40
See application file for complete search history.

(56) References Cited

U.S. PATENT DOCUMENTS

| | | | | |
|---|---|---|---|---|
| 2009/0170539 A1* | 7/2009 | Kortge | ................ | H04L 63/1441 455/466 |
| 2011/0112969 A1* | 5/2011 | Zaid | ....................... | G06Q 10/02 705/50 |

(Continued)

FOREIGN PATENT DOCUMENTS

| | | |
|---|---|---|
| DE | 102011011697 A1 | 12/2011 |
| DE | 202011105142 U1 | 1/2012 |
| DE | 102012022786 A1 | 5/2014 |

(Continued)

*Primary Examiner* — Matthew Smithers
*Assistant Examiner* — Mirza Israr Javed
(74) *Attorney, Agent, or Firm* — Barnes & Thornburg LLP

(57) ABSTRACT

A communication system for managing usage rights to a vehicle, having a vehicle which includes a communication module inside the vehicle, a mobile terminal, and an electronic vehicle key which communicates with the communication module inside the vehicle and with the mobile terminal and allocates usage rights for the vehicle. Allocation of usage rights for the vehicle, which are carried out by the electronic vehicle key, are controlled by the mobile terminal.

27 Claims, 1 Drawing Sheet

(51) Int. Cl.
    *G06Q 20/40*     (2012.01)
    *H04L 29/06*     (2006.01)

(56) References Cited

U.S. PATENT DOCUMENTS

2017/0309098 A1* 10/2017 Watters ................. H04W 4/025
2017/0349143 A1* 12/2017 Menard ................. H04L 9/3271

FOREIGN PATENT DOCUMENTS

| DE | 102013006070 A1 | 10/2014 |
| DE | 102014222426 A1 | 5/2016 |
| DE | 102014222427 A1 | 5/2016 |

* cited by examiner

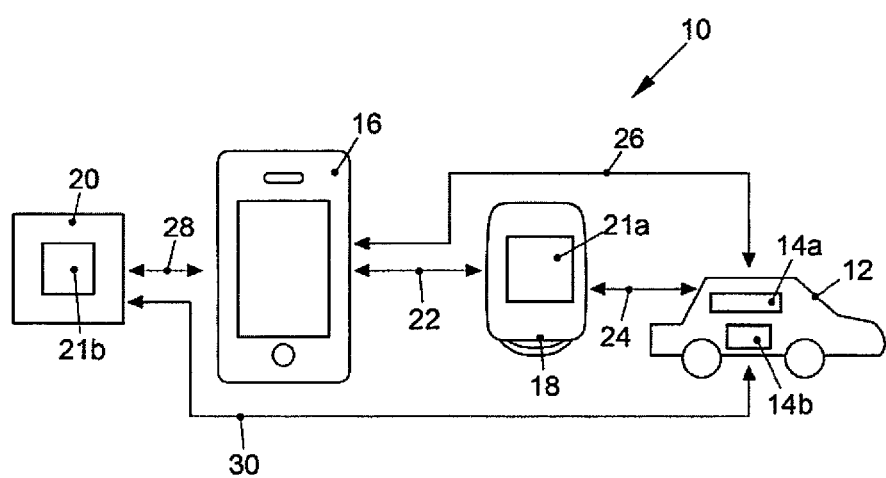

COMMUNICATION SYSTEM FOR MANAGING USAGE RIGHTS ON A VEHICLE

PRIORITY CLAIM

This patent application claims priority to German Patent Application No. 10 2016 215 628.4, filed 19 Aug. 2016, the disclosure of which is incorporated herein by reference in its entirety.

SUMMARY

Illustrative embodiments relate to a communication system for managing usage rights to a vehicle.

BRIEF DESCRIPTION OF THE DRAWINGS

The disclosed embodiments are explained below with reference to the associated drawing, in which FIG. 1 shows a schematic illustration of an exemplary embodiment of the disclosed communication system.

DETAILED DESCRIPTION

The functionality of electronic vehicle keys will increase further in future. For example, electronic vehicle keys will be able to be used not only to lock and unlock the vehicle doors, but rather will likewise allow the management of usage rights to a vehicle.

However, the increasing variety of functions of an electronic vehicle key is opposed by its small size which considerably restricts the operating comfort. A compact electronic vehicle key may only have a limited number of input elements and can optically provide the user with information to a restricted extent.

The document DE 20 2011 105 142 U1 discloses, for example, an electronic vehicle key having an integrated color display which also has a combined function and menu key and extended touchscreen technology for remotely operating the vehicle access and authorization system.

However, the touchscreen of an electronic vehicle key may also have only restricted dimensions so that the manageability of the electronic vehicle key is not impaired. Touchscreens of this size are suitable neither for clearly reproducing information nor for conveniently managing usage rights. On the other hand, if the dimensions of the installed touchscreen are increased, the comfort of use is considerably impaired since it is no longer possible to conventionally carry the electronic vehicle key, for example, on a keyring.

In addition, the integration of display devices, such as touchscreens, and the equipment of an electronic vehicle key with a plurality of communication modules result in a considerably increased energy requirement. However, on account of the small size of an electronic vehicle key, only batteries having a restricted size and therefore a limited capacity can be installed. Additional electronic components result in a rapid discharge, as a result of which the user is forced to regularly replace the batteries. In the case of a rechargeable vehicle key battery, regular charging is required. Both the replacement of the batteries and the charging of the vehicle key battery result in a considerable impairment in the comfort of use.

With regard to the management of usage rights, DE 10 2012 022 786 A1 discloses a method for an access system for a vehicle, the access system comprising a control apparatus, an identification apparatus assigned to the control apparatus and a mobile terminal. A function of the control apparatus can be controlled via the mobile terminal on the basis of an item of authentication information stored in the mobile terminal and the control apparatus. During the method, an item of identification information from the identification apparatus is verified by the control apparatus. In the event of successful verification, the authentication information is generated in the control apparatus and is transmitted from the control apparatus to the mobile terminal.

The document U.S. 2011/0112969 A1 discloses vehicle access control, a vehicle reservation being sent from a wireless communication device to a central server using mobile radio. The central server checks the vehicle reservation, the vehicle being released after the check has been carried out.

The document DE 10 2013 006 070 A1 also discloses a method for transmitting vehicle-specific information to a terminal belonging to a user using wireless communication, an information and communication unit being provided in a respective vehicle and being used to acquire specific data relating to the respective vehicle and to transmit the data, possibly together with further customer-relevant data, to the terminal belonging to the user by a data connection. The terminal or an application to be executed on the latter makes it possible for the user to book and open the respective vehicle within the scope of a car-sharing system.

The document DE 10 2011 011 697 A1 discloses a closing system and a method for controlling an access authorization or travel authorization for a vehicle, and the document DE 10 2014 222 426 A1 discloses a radio key for adapting a configuration of a mode of transport. The document DE 10 2014 222 427 A1 discloses an adaptation of an assignment between a user profile and a radio key.

The known electronic vehicle keys are not sufficiently suitable for managing usage rights to a vehicle. Other known solutions dispense with the incorporation of an electronic vehicle key when managing usage rights to a vehicle, thus giving rise to considerable security risks.

Disclosed embodiments provide a communication system for managing usage rights, which communication system can be comfortably operated by a user and has increased security in comparison with other solutions. This is achieved by the disclosed communication system.

The disclosed communication system for managing usage rights to a vehicle comprises a vehicle, a mobile terminal and an electronic vehicle key. The vehicle comprises a communication module inside the vehicle. The electronic vehicle key is set up to communicate with the communication module inside the vehicle and with the mobile terminal, usage rights for the vehicle being able to be allocated using the electronic vehicle key. The allocation of usage rights for the vehicle, which can be carried out by the electronic vehicle key, can be controlled in this case by the mobile terminal. The usage rights for the vehicle may be allocated, for example, to electronic foreign keys, other electronic portable devices, selected users and/or their user accounts.

In the disclosed communication system, the electronic vehicle key is incorporated when allocating usage rights for the vehicle. When allocating usage rights for the vehicle, for example, to an electronic foreign key belonging to a third party, the possession of the electronic vehicle key is therefore always required, thus considerably increasing security. At the same time, however, usage rights are not allocated by a user operating the electronic vehicle key, but rather by operating the mobile terminal. In this manner, the user is provided with the display and operating elements of the mobile terminal for the purpose of allocating usage rights for the vehicle, with the result that the operating comfort is considerably increased. To further increase the comfort, the electronic vehicle key may also have a display or a touch-screen.

The electronic vehicle key may use a first communication module inside the key to communicate with the mobile terminal and uses a second communication module inside the key to communicate with the communication module inside the vehicle. The first communication module inside the key and the second communication module inside the key may use different communication standards. For example, the communication between the mobile terminal and the electronic vehicle key and/or between the electronic vehicle key and the communication module inside the vehicle takes place at 20 kHz, 125 kHz, 130 kHz, 433 MHz, 868 MHz or 315 MHz by BLUETOOTH®, infrared, RFID, mobile radio, Internet or using a local area network. The mobile terminal may be a smartphone or a tablet, for example.

Usage rights for the vehicle can also be withdrawn using the electronic vehicle key, the withdrawal of usage rights for the vehicle, which can be carried out by the electronic vehicle key, being able to be controlled by the mobile terminal. If usage rights for the vehicle are allocated without a time limit, it is important that the allocated usage rights for the vehicle can also be subsequently withdrawn again. As a result of the fact that the usage rights for the vehicle can be withdrawn by the electronic vehicle key and operation is effected by the mobile terminal, a high degree of security and operating comfort is ensured. The usage rights for the vehicle may be withdrawn, for example, from electronic foreign keys, other electronic portable devices, selected users and/or their user accounts.

The usage rights for the vehicle may comprise individual or all vehicle functions. Vehicle functions are, for example, the locking and unlocking function, the driving function of the vehicle, safety functions, for example, the airbag function, driver assistance functions, for example, automatic distance control, automatic cruise control and/or a lane departure assistance function, adjustment functions, for example, seat or mirror adjustment functions, comfort functions, for example, the seat temperature control, the passenger compartment temperature control, the navigation function or the infotainment function. The release of individual vehicle functions may be sufficient in particular situations for using the vehicle. In other situations, all vehicle functions may also be released at the same time, with the result that the vehicle can be used without restriction.

Usage rights for the vehicle can be allocated and/or withdrawn in an entity-related manner. Usage rights for the vehicle may be allocated and/or withdrawn in a personal manner. Individual or all vehicle functions can therefore be released in a limited manner at the same time or without a time limit for individual persons or for a plurality of persons. Usage rights for the vehicle can also be allocated and/or withdrawn indirectly in a personal manner, with the result that usage rights for the vehicle can be granted to or withdrawn from user accounts and/or electronic vehicle keys belonging to selected persons, for example.

Vehicle functions and/or mobile online services can also be purchased by the electronic vehicle key, the purchase of the vehicle functions and/or of the mobile online services, which can be carried out by the electronic vehicle key, being able to be controlled by the mobile terminal. The vehicle functions and/or mobile online services which can be purchased using the electronic vehicle key may comprise in this case, for example, the locking and unlocking function, the driving function, safety functions, for example, the airbag function, driver assistance functions, for example, automatic distance control, automatic cruise control and/or a lane departure assistance function, adjustment functions, for example, seat or mirror adjustment functions, comfort functions, for example, the seat temperature control, the passenger compartment temperature control, the navigation function or the infotainment function of one or more vehicles.

The purchased vehicle functions and/or the purchased mobile online services can also be used with a plurality of vehicles. The purchased vehicle functions and/or the purchased mobile online services can be used for a group of vehicles. This is beneficial in the field of car sharing, for example. A user can therefore purchase, for example, vehicle functions and/or mobile online services for all or individual vehicles inside a predefined area, for example, inside an urban area. The user can therefore select vehicle functions and/or mobile online services which he would like to use when using the vehicles inside the urban area. The usage rights to one or more vehicles associated with the purchase are tied to the electronic vehicle key or a user account and can be verified with respect to a vehicle through the possession of the electronic vehicle key or registration with a user account in the respective vehicle, for example.

The communication system may comprise a management system which is set up to manage the usage rights to vehicles and/or the purchase of vehicle functions and/or mobile online services. The management system may be provided, for example, by a vehicle manufacturer or a third-party provider. A corresponding management system makes it possible to considerably simplify the management of usage rights to vehicles and/or the purchase of vehicle functions and/or mobile online services.

A vehicle management application may be installed on the electronic vehicle key and/or the mobile terminal and is set up to access the management system. The electronic vehicle key and/or the mobile terminal has/have corresponding communication modules so that the vehicle management application can access the management system. A user can call up a user account via the vehicle management application by a user name and a password. Personal data relating to the user and information relating to the purchase transaction may be stored in the user account. The management of usage rights for the vehicle and/or the purchase of vehicle functions and/or mobile online services can also be carried out using the vehicle management application.

The vehicle management application may be set up to display a graphical interface for managing the usage rights for the vehicle and/or for purchasing vehicle functions and/or mobile online services on the mobile terminal. For example, the vehicle management application comprises a menu structure which is displayed to the user of the mobile terminal. The user can release usage rights for the vehicle to other persons or can withdraw them by appropriately selecting a menu item. Alternatively or additionally, the user can purchase vehicle functions and/or mobile online services by appropriately selecting a menu item. The graphical interface may be designed in such a manner that it allows comfortable operation via a touchscreen.

At least one part of the management system may be a decentralized management system on the electronic vehicle key. As a result of the fact that the management system has a decentralized form on the electronic vehicle key, there is no need for a connection to a central computer, thus considerably simplifying the allocation of usage rights for the vehicle, for example, to electronic foreign keys, other electronic portable devices, selected users and/or their user accounts, the withdrawal of these usage rights for the vehicle and the purchase of vehicle functions and/or mobile online services. The allocation and/or withdrawal of usage rights for the vehicle and the purchase of vehicle functions and/or mobile online services can be carried out without the need for an Internet connection. This may be beneficial, for example, at locations without network availability, for instance, in underground garages, or when managing usage rights to vehicles in a vehicle fleet.

The communication system may also have a central computer, the central computer comprising at least one part of the management system. The central computer may be a server and/or a backend of a vehicle manufacturer or a third-party provider. The central computer may comprise a database which is accessed by the management system for managing usage rights to vehicles and for purchasing vehicle functions and/or mobile online services. For example, the central computer is connected to the Internet. The vehicle management application is set up to establish a communication connection to the central computer, in particular via the Internet.

The mobile terminal may be set up to release a communication module inside the device for the electronic vehicle key, the electronic vehicle key being able to be set up to use the released communication module inside the mobile terminal. The communication module inside the device may be, for example, a radio module which allows the connection to a local radio network and/or the establishment of a mobile radio connection. The communication possibilities of the electronic vehicle key are therefore extended without the necessary hardware therefor having to be present in the electronic vehicle key. This avoids further installation space being used and an additional energy requirement on account of additional communication units inside the electronic vehicle key. The service life of the vehicle key battery is therefore not impaired even though the communication ability of the electronic vehicle key is extended. The electronic vehicle key can be connected to the Internet via the released communication module of the mobile terminal. An Internet connection of the electronic vehicle key also allows access to the key by other devices which are connected to the Internet. For example, the electronic vehicle key can therefore be accessed from a remote position using another mobile terminal, for example, a smartphone or a tablet, or a personal computer if the Internet connectivity of the mobile terminal is available to the electronic vehicle key. The mobile terminal may also be set up to communicate directly with a communication module inside the vehicle. Therefore, not only direct communication between the electronic vehicle key and the vehicle but also direct communication between the mobile terminal and the vehicle is possible. The communication module inside the vehicle which is used for communication between the mobile terminal and the vehicle may be either the same communication module as that used for communication between the electronic vehicle key and the vehicle or another communication module inside the vehicle. The mobile terminal may also be set up to communicate with the central computer, optionally via the communication module inside the mobile terminal which can be released. The electronic vehicle key may also be set up to communicate with the central computer, optionally via the communication module inside the mobile terminal which can be released. The electronic vehicle key can therefore log on to the central computer directly.

The electronic vehicle key may be set up to authorize other electronic vehicle keys to communicate with the communication module inside the vehicle. The authorization may comprise, for example, the use of vehicle functions and/or mobile online services. The communication module inside the vehicle may in this case be the same communication module as that with which the electronic vehicle key communicates or another communication module inside the vehicle. Other electronic vehicle keys can be authorized using a challenge-response method.

The electronic vehicle key may be a personalized and/or personal electronic vehicle key. Such an electronic vehicle key may be issued by a vehicle manufacturer for use by a user or a group of users and is fundamentally not permanently tied to a specific vehicle. The user or the group of users can, for example, couple the electronic vehicle key to one or more vehicles via a corresponding management system, for example, via the central computer, or locally to be able to use these vehicles with the electronic vehicle key. Upon entering the vehicle, the user is then automatically registered with a customer account stored on the electronic vehicle key. The usage authorizations and/or purchased vehicle functions or purchased mobile online services may also be coupled to this customer account. For example, two-factor authentication is required for registration. The electronic vehicle key provides a cryptographic factor for the two-factor authentication, in particular proof of ownership. The electronic vehicle key is therefore also used as proof of authentication. Alternatively, the electronic vehicle key may also be a conventional vehicle-related electronic vehicle key.

The electronic vehicle key may be set up to communicate with a plurality of different communication modules inside the vehicle and/or with a plurality of different mobile terminals. This makes it possible to use the electronic vehicle key for a plurality of vehicles. The corresponding usage authorizations of the user for the plurality of vehicles may also be stored in the user's user account. If the electronic vehicle key is set up to communicate with a plurality of mobile terminals, the use of the electronic vehicle key by a group of users is considerably simplified. The members of the group of users may therefore each access the electronic vehicle key using their mobile terminals. However, for reasons of security, it may be advisable or even necessary for the electronic vehicle key to be able to be coupled only to one mobile terminal at the same time to prevent misuse.

The electronic vehicle key may likewise be set up to cryptographically protect notifications to be transmitted against modification and/or eavesdropping, in particular to cryptographically sign the notifications. As a result of the fact that the electronic vehicle key is suitable for cryptographically signing notifications to be transmitted, the authenticity of the notifications can be checked. The electronic vehicle key may comprise a memory which stores cryptographic material. The data in the memory of the electronic vehicle key may be partially or completely stored as plain text or as a cipher and/or as ciphertext. The ciphertext may have been produced from plain text either by a reversible operation or by an irreversible operation. If the ciphertext has been produced from plain text by a reversible operation, the production operation can be reversed to produce the plain text from the ciphertext. If the ciphertext has been produced from plain text by an irreversible operation, the plain text cannot be produced from the ciphertext by reversing the production operation. The irreversible operation may be based on a hash function.

The electronic vehicle key may provide an open API (application programming interface). The mobile terminal can communicate directly with the electronic vehicle key using an available communication technology, for example, BLUETOOTH®, NFC®, ZIGBEE®, USB. To protect the communication between the mobile terminal and the electronic vehicle key, authentication can be carried out between the electronic vehicle key and the mobile terminal. The authentication can be carried out on one side or on both sides. The presence of the counterpart station can be checked by the authentication. The communication between the mobile terminal and the electronic vehicle key can also be encrypted and/or authenticated by choosing a cryptographic solution for protection. The vehicle management application and the logic may run on the mobile terminal in this case. The vehicle management application can therefore access the functions and the memory of the electronic vehicle key.

Alternatively, a trusted execution environment (TEE) exists on the electronic vehicle key. Only applications which have been approved or released by the manufacturer of the vehicle run in this execution environment. These applications can also only be introduced into the execution environment via a secure process. The form of this process depends on the technology used in the execution environment. The mobile terminal may be set up to establish a remote maintenance session with the electronic vehicle key during coupling, for example, using Virtual Network Computing. In this case, the mobile terminal is used as a pure display and operating device and/or is used as an interface to the Internet. The vehicle management application therefore runs on the electronic vehicle key and the interfaces and graphics are also calculated on the electronic vehicle key. These interfaces are then transmitted to the mobile terminal for display. Conversely, the mobile terminal transmits control commands and/or data from the Internet to the electronic vehicle key in the secure environment. The application logic therefore runs completely on the electronic vehicle key and is therefore under the control of the vehicle manufacturer. The data from the mobile terminal, for example, the control commands and/or the data from the Internet, may be protected or authenticated, with the result that no incorrect or manipulated data can enter the secure execution environment.

The user data may be protected on the mobile terminal and/or the electronic vehicle key. For example, protection is effected by a pin or password request during connection between the mobile terminal and the electronic vehicle key. This offers straightforward and simple access protection against manipulation.

Further configurations of the disclosure emerge from the other features mentioned. The different disclosed embodiments mentioned in this application can be combined with one another, unless stated otherwise in the individual case.

FIG. 1 shows a communication system 10 for managing usage rights to a vehicle 12. The communication system 10 comprises a vehicle 12, a mobile terminal 16, an electronic vehicle key 18 and a central computer 20.

The vehicle 12 has two communication modules 14a, 14b inside the vehicle. The vehicle 12 communicates with the electronic vehicle key 18 using the communication module 14a inside the vehicle. The communication connection 24 based on the BLUETOOTH® standard is used for communication between the communication module 14a inside the vehicle and the electronic vehicle key 18. The vehicle 12 communicates with the mobile terminal 16 and the central computer 20 using the communication module 14b inside the vehicle. The communication connection 26 based on mobile radio is used for communication between the communication module 14b inside the vehicle and the mobile terminal 16. The communication connection 30 based on mobile radio is used for communication between the communication module 14b inside the vehicle and the central computer 20.

The mobile terminal 16 is set up to release a communication module inside the mobile terminal 16 for the electronic vehicle key 18, the electronic vehicle key 18 being set up to use the released communication module inside the mobile terminal 16. The electronic vehicle key 18 can therefore communicate with central computer 20 via the communication module inside the mobile terminal 16 which can be released. The central computer 20 is specifically set up to communicate with the mobile terminal 16 via the communication connection 28. The electronic vehicle key 18 is a personalized and personal electronic vehicle key 18 which is set up to cryptographically protect notifications to be sent against modification and/or eavesdropping.

The communication system 10 also has a management system 21a, 21b which is set up to manage the usage rights to vehicles and the purchase of vehicle functions and mobile online services. A first part 21a of the management system 21a, 21b may be a decentralized management system on the electronic vehicle key 18. A second part 21b of the management system 21a, 21b may be a central management system on the central computer 20.

The electronic vehicle key 18 is set up to communicate with the mobile terminal 16 via the communication connection 22. A vehicle management application is respectively installed on the electronic vehicle key 18 and on the mobile terminal 16 and is set up to access the management system 21a, 21b, the vehicle management application being set up to display a graphical interface for managing the usage rights for the vehicle 12 and for purchasing vehicle functions and mobile online services on the mobile terminal 16.

The electronic vehicle key 18 can be used to allocate and withdraw usage rights for the vehicle 12. Vehicle functions and/or mobile online services can also be purchased using the electronic vehicle key 18.

The allocation of usage rights for the vehicle 12, which can be carried out by the electronic vehicle key 18, and the withdrawal of usage rights for the vehicle 12, which can be carried out by the electronic vehicle key 18, can be controlled by the mobile terminal 16. In addition, the purchase of the vehicle functions and of the mobile online services, which can be carried out by the electronic vehicle key 18, can be controlled by the mobile terminal 16.

Usage rights for the vehicle 12 are allocated and withdrawn in a personal manner, the usage rights for the vehicle 12 comprising all vehicle functions, specifically, for example, the locking and unlocking function, the driving function of the vehicle 12, safety functions, for example, the airbag function, driver assistance functions, for example, automatic distance control, automatic cruise control and/or a lane departure assistance function, adjustment functions, for example, seat or mirror adjustment functions, comfort functions, for example, the seat temperature control, the passenger compartment temperature control, the navigation function or the infotainment function. The purchased vehicle functions and the purchased mobile online services can also be used with a plurality of vehicles.

As a result of the fact that the allocation and withdrawal of usage rights for the vehicle, which can be carried out by the electronic vehicle key, and the purchase of vehicle functions and mobile online services can be controlled by the mobile terminal, the operating comfort is considerably increased, in which case a high degree of security is ensured on account of the need to possess the electronic vehicle key.

LIST OF REFERENCE SYMBOLS

10 Communication system
12 Vehicle
14a, 14b Communication modules inside the vehicle
16 Mobile terminal
18 Electronic vehicle key
20 Central computer
21a, 21b Management system
22-30 Communication connections

The invention claimed is:

1. A communication system for managing usage rights to a vehicle, the communication system comprising:
   a vehicle which comprises a communication module inside the vehicle; and
   an electronic vehicle key which communicates, via one or more communications modules inside the electronic vehicle key, with the communication module inside the vehicle and with a mobile terminal, and which allocates usage rights for the vehicle,
   wherein the allocation of usage rights for the vehicle, which are carried out by the electronic vehicle key, are controlled by the mobile terminal,
   wherein usage rights for the vehicle are withdrawn by the electronic vehicle key and the withdrawal of usage rights for the vehicle, which are carried out by the electronic vehicle key, are controlled by the mobile terminal.

2. The communication system claim 1, wherein the usage rights for the vehicle comprise individual or all vehicle functions.

3. The communication system of claim 1, wherein usage rights for the vehicle are allocated and/or withdrawn based identification of one or more persons or entities.

4. The communication system of claim 1, wherein vehicle functions and/or mobile online services are purchased by the electronic vehicle key and the purchase of the vehicle functions and/or of the mobile online services, which are carried out by the electronic vehicle key, are controlled by the mobile terminal.

5. The communication system of claim 4, wherein the purchased vehicle functions and/or the purchased mobile online services are used with a plurality of vehicles.

6. The communication system of claim 1, wherein a management system manages the usage rights to vehicles and/or the purchase of vehicle functions and/or mobile online services.

7. The communication system of claim 6, wherein a vehicle management application is installed on the electronic vehicle key and/or the mobile terminal and accesses the management system.

8. The communication system of claim 7, wherein the vehicle management application displays a graphical interface for managing the usage rights for the vehicle and/or for purchasing vehicle functions and mobile online services on the mobile terminal.

9. The communication system of claim 6, wherein at least one part of the management system is a decentralized management system on the electronic vehicle key.

10. The communication system of claim 6, further comprising a central computer, the central computer comprising at least one part of the management system.

11. The communication system of claim 1, wherein the electronic vehicle key uses a communication module released for the electronic key by the mobile terminal.

12. The communication system of claim 1, wherein the electronic vehicle key authorizes other electronic vehicle keys to communicate with a communication module inside the vehicle.

13. The communication system of claim 1, wherein the electronic vehicle key is a personalized and/or personal electronic vehicle key.

14. The communication system of claim 1, wherein the electronic vehicle key cryptographically protects notifications to be transmitted against modification and/or eavesdropping.

15. A communication methodology for managing usage rights to a vehicle, the methodology comprising:
   an electronic vehicle key communicating, via one or more communications modules inside the electronic vehicle key, with a vehicle communication module and with a mobile terminal;
   the electronic vehicle key allocating usage rights for the vehicle under control of the mobile terminal,
   wherein usage rights for the vehicle are withdrawn by the electronic vehicle key and the withdrawal of usage rights for the vehicle, which are carried out by the electronic vehicle key, are controlled by the mobile terminal.

16. The communication methodology of claim 15, wherein the usage rights for the vehicle comprise individual or all vehicle functions.

17. The communication methodology of claim 15, wherein usage rights for the vehicle are allocated and/or withdrawn based identification of one or more persons or entities.

18. The communication methodology of claim 15, wherein vehicle functions and/or mobile online services are purchased by the electronic vehicle key and the purchase of the vehicle functions and/or of the mobile online services, which are carried out by the electronic vehicle key, are controlled by the mobile terminal.

19. The communication methodology of claim 18, wherein the purchased vehicle functions and/or the purchased mobile online services are used with a plurality of vehicles.

20. The communication methodology of claim 15, further comprising a management system managing the usage rights to vehicles and/or the purchase of vehicle functions and/or mobile online services.

21. The communication methodology of claim 20, wherein a vehicle management application is installed on the electronic vehicle key and/or the mobile terminal and accesses the management system.

22. The communication methodology of claim 21, further comprising the vehicle management application displaying a graphical interface for managing the usage rights for the vehicle and/or for purchasing vehicle functions and mobile online services on the mobile terminal.

23. The communication methodology of claim 20, wherein at least one part of the management system is a decentralized management system on the electronic vehicle key.

24. The communication methodology of claim 15, further comprising the electronic vehicle key using a communication module released by the mobile terminal for the electronic vehicle key.

25. The communication methodology of claim 15, further comprising the electronic vehicle key authorizing other electronic vehicle keys to communicate with a communication module inside the vehicle.

26. The communication methodology of claim 15, wherein the electronic vehicle key is a personalized and/or personal electronic vehicle key.

27. The communication methodology of claim 15, further comprising the electronic vehicle key cryptographically protecting notifications to be transmitted against modification and/or eavesdropping.

* * * * *